United States Patent
Owen, IV et al.

(10) Patent No.: US 6,901,030 B1
(45) Date of Patent: May 31, 2005

(54) TRACKING MULTIPLE TARGETS IN DENSE SENSOR FIELDS

(75) Inventors: Archibald Alexander Owen, IV, Stow, MA (US); Michael Bruce Goldsmith, Framingham, MA (US); Peter Allen Krumhansl, Amherst, MA (US); Yevgeniy Yakovlevich Dorfman, Allston, MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 10/366,256

(22) Filed: Feb. 13, 2003

Related U.S. Application Data
(60) Provisional application No. 60/356,311, filed on Feb. 13, 2002.

(51) Int. Cl.$^7$ .............................. G01S 3/80; G06F 15/00
(52) U.S. Cl. ........................................ 367/124; 702/189
(58) Field of Search ................................ 367/124, 125, 367/126; 382/103; 702/73, 189

(56) References Cited

U.S. PATENT DOCUMENTS

| | | | | |
|---|---|---|---|---|
| 4,333,170 A | * | 6/1982 | Mathews et al. | 367/125 |
| 5,014,250 A | * | 5/1991 | Hadderingh | 367/124 |
| 5,581,620 A | * | 12/1996 | Brandstein et al. | 367/126 |
| 6,198,693 B1 | * | 3/2001 | Marash | 367/125 |

* cited by examiner

*Primary Examiner*—Ian J. Lobo
(74) *Attorney, Agent, or Firm*—Ropes & Gray LLP

(57) ABSTRACT

The methods and systems relate to tracking targets, and more particularly to tracking multiple targets within a field of densely distributed sensor nodes using wave processing/analysis methods applied to "target-waves" in an observable physical phenomena. The "target-waves" are target induced perturbations of a physical phenomena that are analogous to a propagating wave where the wave propagation velocities are equal to the target velocities. The term "target" refers to an individual object, or a group of objects that can be treated as an entity, whose position, speed, direction, separation, etc. is of interest to a user. Some examples, not exclusive, are military vehicles (e.g. tanks) along a road, people on sidewalks or in halls, and ships at sea.

38 Claims, 6 Drawing Sheets

TRACKING MULTIPLE TARGETS IN DENSE SENSOR FIELDS

RELATED APPLICATIONS

This application claims priority to, and incorporates by reference, the entire disclosure of U.S. Provisional Patent Application No. 60/356,311, filed on Feb. 13, 2002.

FIELD OF THE INVENTION

The methods and systems relate to tracking targets, and more particularly to tracking multiple targets within a field of densely distributed sensor nodes.

BACKGROUND

Stand-off Sensing Systems

Some sensor systems for detecting, localizing and tracking (DLT) targets, e.g., military vehicles such as tanks along a road, may utilize a handful of acoustic (or possibly others such as seismic) sensor arrays in a stand-off configuration from the targets of interest. Such systems, referred to as "stand-off" sensing systems, may sometimes utilize traditional beamforming techniques to ascertain lines of bearing to the targets, an association algorithm to associate lines of bearing and classification clues to localize the target(s), and a tracker to build and maintain target tracks.

Dense Distributed Sensing Systems

More recently, some sensor systems are being contemplated and developed that utilize a large number of inexpensive, densely spaced, sensors, which can blanket a large area where a target may be acquired by one or more of the sensors. These more recent systems may be referred to as "dense distributed" sensing systems. In one common implementation of a dense sensor system, one or more individual sensors (e.g. acoustic, seismic, IR motion, magnetic anomaly, bio-chemical, etc.) are co-located with and connected to support electronics (e.g., possibly a processor and communications hardware), and the combined sensor/electronics package is referred to as a sensor node. The sensor nodes communicate with each other through a communications network (e.g. radio or hardwired Ethernet). Alternately, the dense sensor system may have, instead of sensor nodes with a communications network, hardwired connections from each individual sensor directly to a processing module that may contain one processor, or several processors working in consort.

Current dense distributed sensing systems can have an algorithmic architecture that builds tracks for individual targets and may employ different sensor modalities for the tracking filter inputs. The algorithms may use simple measures such as time of Closest Point of Approach (CPA), Root-Mean-Square (RMS) intensity, etc., to locate and track one or more targets. In current instantiations, the algorithms typically use these measures to identify individual targets and build a track record for each individual target.

A common (but not exclusive) data processing chain for dense distributed sensing systems is that a sensor node processes data from its own sensors, and when it detects a target, the detection is compared to the list of known tracks and a decision is made as to whether the detection is associated with one of the known targets (i.e., an existing track), or is from a new target (i.e. a new track). In dense distributed sensing systems, the tracking may be done in the sensor node field; as a target travels past the sensor nodes, the communications network can distribute the latest track update in the general direction of travel, so that "downstream" sensor nodes have a track history to use for their data association and on which to build their track update.

Issues Associated with Large Target Counts and Increased Target Density

In both "stand-off" sensing systems and the current state of the art "dense distributed" sensing systems, the computation load can grow rapidly and track association can quickly become unmanageable as the target count increases and becomes denser. Tracking algorithms used in state of the art dense distributed sensing systems may be adequate for tracking an individual target or relatively small groups of targets. However, as the number of targets increases, the communications network traffic increases if the "track update" is transmitted to multiple sensor nodes ahead of the targets. In addition, the data association can become extremely complex and, in effect, intractable for very dense target fields, such as when convoys of targets may be moving in opposite directions along a road. Such "tracker overload" is an issue in stand-off sensing systems as well, since they also often build separate tracks for individual targets.

SUMMARY OF THE INVENTION

A method of tracking one or more targets within a sensor system is provided, in which variations in a physical phenomena, e.g., acoustic intensity or seismic intensity, due to motions of the targets can be approximated as being propagating waves, i.e., "target-waves", traveling at the target velocities. Coherent temporal-spatial processing is performed to identify and measure these propagating target-waves and thus characterize the target motions. The method may employ analysis and signal processing techniques commonly utilized for detecting and measuring physical wave propagation phenomena, e.g., k-$\omega$ processing and beamformers. The results of the wave propagation analysis are used to ascertain motion parameters for the targets and these motion parameters are output to track the targets.

The method may include sensor pre-processing to convert the sensor output and reduce its rate to that appropriate to capture the target-wave temporal-spatial structure. One sensor pre-processing embodiment may comprise sampling data from sensors at a rate appropriate to the physical phenomena associated with the sensor modality and converting and reducing the data rate by computing and outputting, to the coherent temporal-spatial processing, the corresponding short term intensity levels. Another sensor pre-processing embodiment may comprise passing the high rate sensor data through a band-pass filter, computing the short term intensity levels of the filter output, and outputting, to the coherent temporal-spatial processing, the corresponding lower rate band-pass intensity levels. One embodiment of the short term intensity computation may be to use a rectifier and a band pass filter. Another embodiment of the short term intensity computation may be to square and sum the high rate data over a specified interval. Another embodiment of the short term intensity computation may be to use a Hilbert Transform.

In one embodiment, there may be provided a method of tracking multiple targets within a field of sensor nodes, wherein the coherent temporal-spatial processing may comprise transforming pre-processed two-dimensional temporal-spatial data into the frequency-wavenumber domain (i.e. k-$\omega$) via a Fourier Transform (where the Fourier transform may be implemented using the Fast Fourier or Discrete Fourier transform technique), determining fundamental spectral harmonics of the transformed data, determining the target speed and separation based on the fundamental harmonics (velocity is the slope of frequency/wavenumber and separation is proportional to 1/wavenumber), and outputting the speed and separation parameters to track the targets. In a variant of this embodiment, the low rate data may be high-pass filtered prior to performing the two dimensional transform, so as to remove any DC component from the data.

Other embodiments may use other wave analysis techniques for detecting and measuring target-waves and thus tracking multiple targets within a field of sensor nodes. In one embodiment, the coherent temporal-spatial processing may comprise transforming low-rate two-dimensional temporal-spatial sensor data into the delay-slowness domain, which is functionally equivalent to time domain beamforming. In one embodiment, two-dimensional temporal-spatial data may be transformed to the two-dimensional wavelet domain. Another embodiment may employ a transform domain whose pre-selected basis set (i.e. other than sinusoids used in the Fourier transform) that is specifically chosen to concentrate the transformed energy into a minimal number of basis vectors. Another embodiment may employ adaptive beamforming to discriminate the different target-waves.

Computer-readable medium can be provided that contains instructions for controlling a computer system to track multiple targets within a field of sensors. The instructions can control the computer to sample data from the sensors to provide a sampled measure of a temporal-spatial structure of signals from the targets at each sensor location, to use wave propagation analysis to identify propagating waves in the sampled measures resulting from motions of the at least one target, to analyze results of the wave propagation analysis to ascertain motion parameters for the at least one targets, and to output the motion parameters to track the at least one target. In one embodiment, the computer readable medium can control the computer system to use k-ω processing of the sampled measures and to apply a Hanning window to the data. The instructions can control the computer system to pre-process the data from the sensors to provide the sampled measure using low-pass filtering, down-sampling, temporal and spatial high-pass filtering and/or band-pass filtering.

A system for tracking targets can include a plurality of sensors providing data signals corresponding to a measure of a temporal-spatial structure of signals from the targets, a wave propagation analyzer receiving the data signals and identifying propagating waves in the temporal-spatial structure of signals from the targets resulting from motions of the targets and a processor to ascertain motion parameters for the targets based on the identified propagating waves and to output the motion parameters to track the targets.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF CERTAIN ILLUSTRATED EMBODIMENTS

Example Scenario

Figure 1:
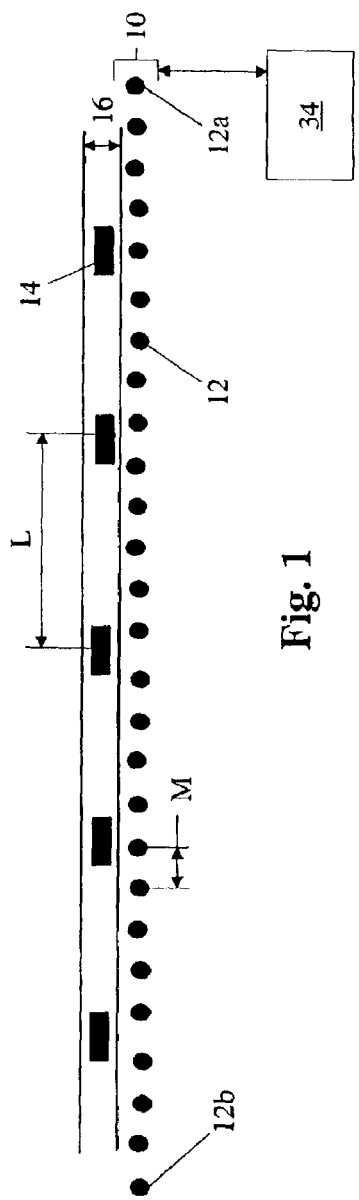
FIG. 1 shows a schematic representation of a sensor node field.

Referring to FIG. 1, a sensor node field 10 includes a number of sensor nodes 12 containing sensors, such as acoustic sensors (only one such sensor node is so designated in FIG. 1 for clarity), that may be used to track one or more targets 14, such as vehicles moving along a path 16, such as a road. For simplicity sake, FIG. 1 illustrates a fairly simple sensor node field 10, where sensor nodes 12, with acoustic sensors, are evenly spaced in a row along road 16. It can be understood that the principles described in relation to FIG. 1 are applicable to dense distributed sensor systems and more complex scenarios, including, but not limited to, different targets besides vehicles, more complex geometries, sensor node fields, sensor types, and target motions. The terminology in this patent application usually presumes that a dense distributed sensor system is comprised of networked sensor nodes, but it is not meant to preclude a dense distributed sensor system in which the distributed sensors are connected directly to a central processing module.

In multi-target environments, targets often move in a structured fashion such as a truck convoy on a road or a ship convoy at sea. These structured target organizations may induce temporal-spatial patterns in physical phenomena that are analogous to waves, which are propagating at the target velocities and are thus referred to as "target-waves". They travel at the target speed instead of the propagation speed of the physical phenomena (e.g., sound speed). Such target-waves are identifiable using coherent spatial-temporal waveform processing. Since target-wave wavelength and frequency are the result of target spacing and speed, the periodicity (temporal and spatial) of the target-waves may be relatively long in time and space compared to those associated with the specific energy propagation mechanism. For an example using acoustic sensors, the acoustic intensity target-wave periods may be seconds corresponding to targets passing a sensor, whereas the acoustic pressure period may be on the order of milliseconds, and acoustic intensity target-wave spatial scales may be on the order of 50 to 100 meters corresponding to the target separation, whereas an acoustic wavelength may be on the order of meters. A detailed explanation of target waves is as follows:

a. Any individual target has (or is assumed to have) a measurable phenomenological signal, $I_v$, with a temporal-spatial structure, $I_v(t,x)$, such that the time and space dependence for the signal can be approximated as being a function of the quantity $(v_v t-x)$ (where t represents time, x is a vector representing target location such that the origin of x is chosen without loss of generality to be the target location at t=0, and $v_v$ is a vector representing the target velocity) so that the temporal-spatial signal $I_v(t,x)$ associated with the target can be approximated as a wave propagating with a velocity $v_v$ (i.e. the target velocity), which is referred to as a "target wave".

b. A group of targets (i.e. a convoy) moves, or is assumed to move, in a structured formation with a constant velocity $v_c$ such that the net phenomenological signal of the convoy $I_c(t,x)$ has a dependence on space and time that can be approximated as being a function of the quantity $(v_c t-x)$ (where t represents time, x is a vector representing the convoy location, and $v_c$ is a vector representing the convoy velocity) so that the signal $I_c(t,x)$ associated with the convoy can be approximated as a wave propagating with a velocity $v_c$ (i.e. the convoy velocity), which is referred to as a "target wave".

c. Multiple targets and/or convoys may be present simultaneously so that the aggregate phenomenological temporal-spatial signal, $I_a(t,x)$, can be approximated as consisting of multiple target waves propagating at the target and convoy velocities through the space occupied by the sensor field.

Figure 2:
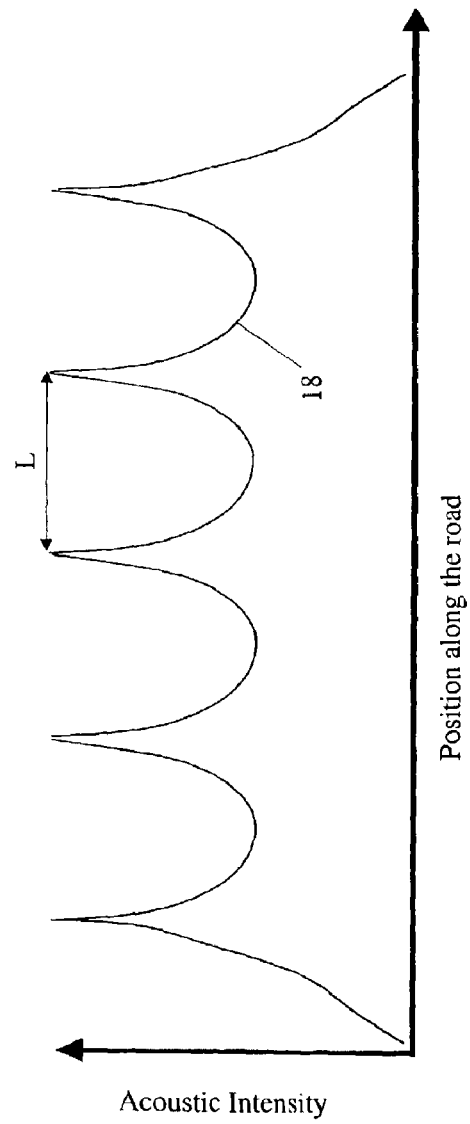
FIG. 2 shows a plot of intensity levels (e.g. acoustic intensity) versus location within a sensor node field at a point in time.

For the illustrative case shown in FIG. 1, road 16 is straight with N acoustic sensors on sensor nodes 12 placed along one side of the road 16 at a separation of M. The acoustic sensor outputs are pre-processed to provide low-sample-rate acoustic intensity data to the coherent temporal-spatial processing further described herein. Vehicles 14 move down road 16 with a separation of L between vehicles 14. FIG. 2 is a plot of acoustic intensity along the road 16 at time $T_1$ for the sensor node field 10 and vehicles 14 of FIG. 1. As might be expected, the acoustic intensity curve, labeled 18 in FIG. 2, has peaks at the vehicle 14 locations along road 16, such that the peaks of acoustic intensity have a separation corresponding to the vehicle 14 separation L.

Figure 3:
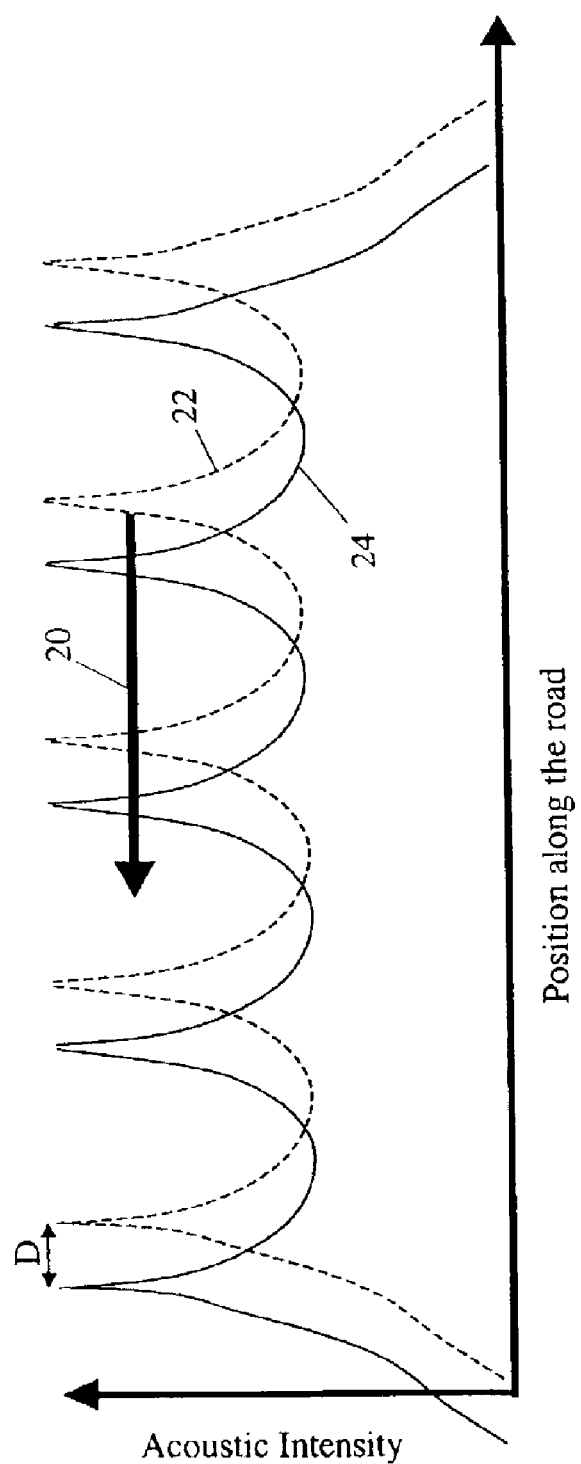
FIG. 3 shows a plot of intensity levels (e.g. acoustic intensity) versus location within a sensor node field for two points in time.

Referring to FIG. 3, the spatial intensity pattern "propagates" down the road 16 as the vehicles 14 move down the road 16, in a direction illustrated by arrow 20. In FIG. 3, the acoustic intensity at time $T_1$ is shown by dashed curve labeled 22 and the acoustic intensity at time $T_2$ is shown by solid curve labeled 24. The separation between peak intensities of curves 22 and 24 corresponds to the distance D over which vehicles 14 have moved in the time interval $T_2-T_1$. This propagation of intensity down the road 16 is analogous to the propagation of a mechanical wave through a medium, and thus is referred to as a target-wave that is propagating at the vehicle velocity.

Parameters Used to Simulate Example Scenario

An example calculation, or simulation, for sensor field 10 of FIG. 1 can be prepared using the following parameters:

A total of 70 (N=70) omni-directional acoustic sensors on sensor nodes 12 are uniformly spaced along straight road 16 at M=12.5 meter spacing. Thus, the line of sensors nodes 12 covers an 862.5 meter stretch of road.

A total of 30 (P=30) identical vehicles 14 travel down the road 16 at 20 mph with a spacing between vehicles of 50 m (L=50).

For this scenario, the evolution time line is as follows:

T=0: simulation starts with first vehicle 500 m from the first sensor node 12a

T=56 seconds: first vehicle passes sensor node 12a

T=152 seconds: first vehicle passes last sensor node 12b. The last vehicle has not yet reached sensor node 12a.

T=600 seconds: simulation ends, last vehicle is 2552 m from sensor node 12b, i.e., the vehicles have passed sensor node field 10.

Application of the k-ω Processing Method to the Example Scenario to Identify Target-Waves and Detect and Track the Associated Vehicles For the one dimensional example described with respect to FIGS. 1–3, a well-known waveform processing method referred to as "wavenumber-frequency" processing, or k-ω processing, may be used to process the measured intensities from the sensor nodes 12. For this example, the input to the k-ω processing is the acoustic intensity measured on the sensor nodes 12, sampled at a low rate (e.g. 2.5 Hz). The measured intensity data can be processed to identify the target-waves and hence derive important target tracking parameters including, but not limited to, target speed and direction, location of the target "group" relative to the sensor node field 10, and target spacing (e.g., for a convoy).

As is known, k-ω processing is a two dimensional Fourier transform of sensor data collected from a number of spatially separated sensors over some prescribed time interval. One transform is from time to frequency (ω) and the other transform is from spatial location to wavenumber (k), which can be thought of as spatial frequency. A sinusoid in the time domain is Fourier transformed to a single frequency; a sinusoid in the spatial domain is Fourier transformed to a single wavenumber. The order of transformation can be either time or space first, with the result being the same. The low-sample-rate data at sensor location $x_n$ and time t can be denoted as $I(x_n,t_h)$, where the "n" indicates sensor n of N and "h" indicates sample h of H. As shown in FIG. 1, the sensors can be separated by M (i.e. $x_{n-1}=x_n+M$) and the time samples can be separated by T seconds (i.e. $t_{h+1}=t_h+T$). The transformed data, $I(k,\omega)$ can be expressed as:

$$I(k,\omega) = \sum_{n=1}^{N} \sum_{h=1}^{H} I(x_n, t_h) \cdot e^{-j(knM+\omega hT)}$$

The transform can be implemented as a well-known Fast Fourier Transform (FFT), given a uniform spacing and sampling of the sensors 12 in powers of 2. Alternately, the transform can be implemented as a standard, well-known Discrete Fourier Transform (DFT). The data may be "windowed" prior to the Fourier transform, with one of a variety of windows employed in the art (e.g. Hanning window) to control the side lobe behavior.

Figure 4:
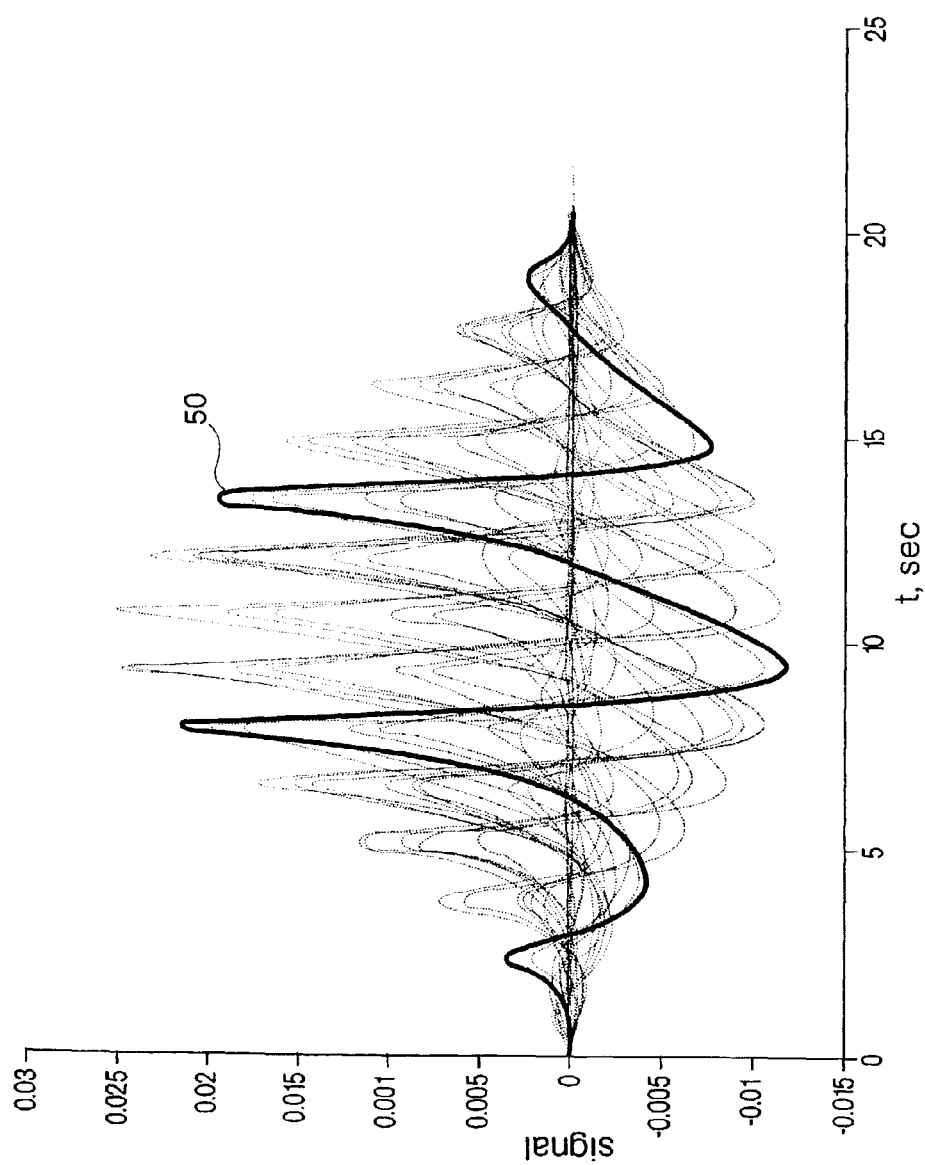
FIG. 4 shows the low rate intensity data for each sensor in the sensor field of FIG. 1, after having been high-pass filtered to remove the DC component.

FIG. 4 shows an exemplary plot of the sampled acoustic intensity (signal) from acoustic sensors on sensor nodes 12 for the interval (time t in seconds) when the total vehicles 14, or convoy, spanned the full sensor node field 10. The data represented in the exemplary plot of FIG. 4 is prefiltered with a high-pass filter to remove the DC component so that the signal is zero mean. Each curve of the exemplary plot of FIG. 4 represents the acoustic intensity at one of the sensor nodes 12. For illustrative purposes, one of the curves is highlighted and labeled as curve 50. Other filtering techniques may also be used for various purposes when practicing embodiments of the invention. Examples include, but are not necessarily limited to: (1) low-pass or band-pass filtering and down-sampling to reduce data quantity and rate; (2) rectifying and low pass filtering sensor output, squaring and short term summing sensor output, or performing a Hilbert transform on sensor output to compute average sensor output power, i.e. signal intensity; and (3) pass-through filtering, i.e., using a filter having an output equal to the filter input.

Figure 5:
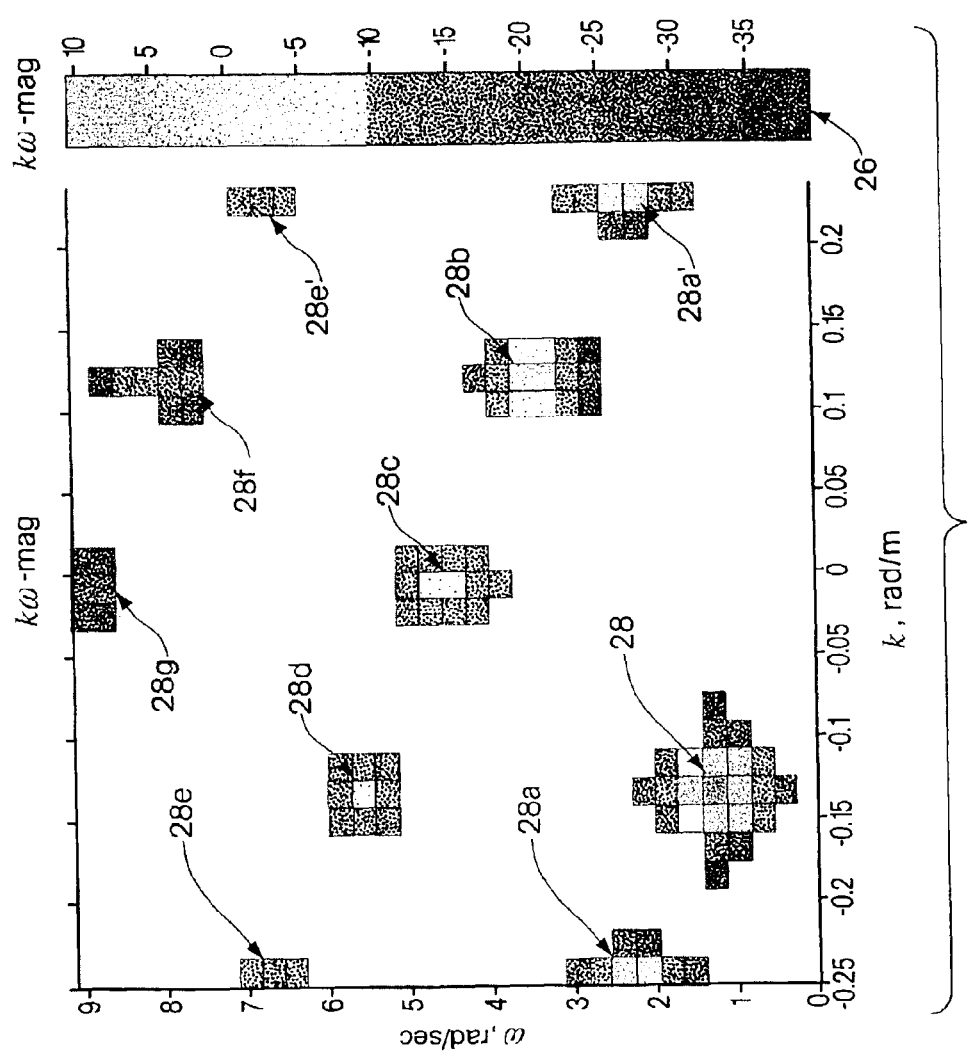
FIG. 5 shows the time series data of FIG. 4 transformed to the k-ω domain.

FIG. 5 shows the transformed data for the exemplary set of time series of FIG. 4. In keeping with accepted practice in the art, each pixel in FIG. 5 has an associated magnitude $|I(k,\omega)|$, the value of which is designated by the shading in bar 26. A grouping of pixels having high $|I(k,\omega)|$ values is deemed a highlight. For FIG. 5, the following observations can be made:

(1) Although acoustic intensity is a positive signal, the high-pass filter is seen to have removed the DC component such that there is no "highlight" at ω=0.

(2) A "highlight", labeled 28 in FIG. 5, is at the fundamental spatial and temporal "harmonic" of the acoustic intensity fluctuations associated with the vehicle convoy passage. In the example described, with a vehicle 14 separation of 50 meters and a vehicle 14 speed of 20 mph, the intensity peaks pass the sensor nodes $$12 \text{ at } \frac{50 \text{ m}}{20 \text{ mph}} = 5.5$$

second intervals. Thus in FIG. 5, the "highlight" is at $$k = \frac{2\pi}{50 \text{ meter}} = 0.13 \tfrac{1}{\text{meter}} \text{ and}$$

$$\omega = \frac{2\pi}{50 \text{ meter}/20 \text{ mph}} = 1.12 \tfrac{1}{\text{sec}}.$$

(3) The wavenumber axis (k, rad/m) in FIG. 5 spans both the positive and negative wavenumbers, but the primary highlight is seen only in the negative wavenumber regime, which indicates the direction of the vehicle 14 motion (to the left in FIG. 1). Vehicles 14 traveling in the other direction would induce positive wavenumber energy instead of negative wavenumber energy.

(4) "Harmonics" of the fundamental, labeled as 28a–28g in FIG. 5, are seen since the intensity signal in this simulation is not a pure sinusoid. Starting at the fundamental harmonic 28, they appear as highlights repeating towards the upper left, beginning with 28a and progressing to 28g (for the negative wavenumber fundamental harmonic in this example). Aliasing harmonics appear in positive wavenumbers (e.g., 28a' and 28e') when the negative wavenumber harmonics pass below the negative Nyquist wavenumber.

Figure 6:
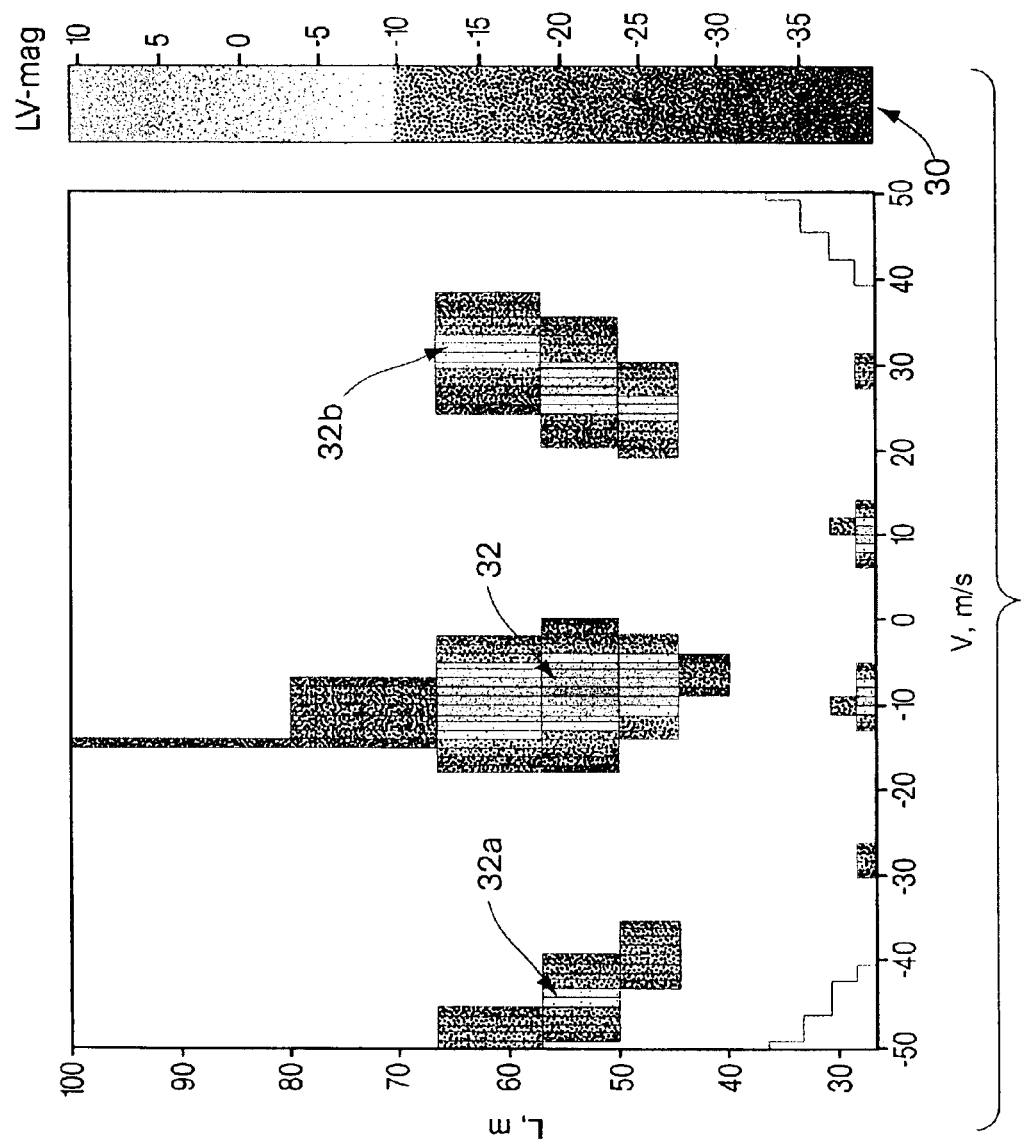
FIG. 6 shows the k-ω domain data of FIG. 5 transformed to the velocity-separation domain.

One can transform the k-ω plane into a plane defined by wavelength, L, and speed, V, where L=2π/k and V=ω/k. FIG. 6 may show the results in FIG. 5 transformed from the (k,ω) plane to the (L,V) plane. Similar to FIG. 5, the pixels in FIG. 6 have an associated magnitude |I(L,V)|, the value of which is designated by the shading in bar 30. FIG. 6 clearly has a "highlight" 32 at V~9 meter/sec (i.e., 20 mph) and L=50 m. The values of V and L associated with this highlight indicate the convoy velocity and spacing, respectively. Lower level highlights (e.g., 32a and 32b) can be seen at other separations and velocities, which can correspond to the harmonics noted in FIG. 5.

Benefits of Proposed Approach

In the described embodiments, and alternates discussed subsequently, four problems encountered in "stand-off" systems and in state-of-the art "densely distributed" sensor systems, when there are large numbers of targets, may be eliminated or at the least diminished in importance by using the proposed method of waveform processing of the target-waves. First, information on the motion of a group of targets is directly provided, whereas current approaches typically identify individual targets and do not directly provide "group" information. In the example presented above, the method gives a direct measure of the convoy group velocity (instead of the velocities of the individual targets) and a measure of spacing (instead of the individual locations of each target).

Second, data association overload problems, encountered when there are large numbers of densely spaced targets, may be avoided because the method does not attempt to resolve and maintain identities of individual targets. Thirdly, processing and communications loads can remain approximately constant no matter what the target density, whereas current systems may require increasing computation and network activity as target density increases. In the above example, the processing and communication would nominally be that required to pre-process the raw sensor signal to provide low-rate intensity data, transmit the low-rate data, and perform the two-dimensional Fourier transform.

Fourthly, target detections are not required on an individual target to initiate the tracking processing. Generally, "stand-off" and state-of-the art "densely distributed" systems require that a detection process on each individual sensor node detect a target before any further classification or tracking occurs. If the signal SNR (Signal-to-Noise Ration) is low at a sensor node, it might not detect the target and would thus not provide information to the tracking algorithm. Coherent temporal-spatial processing, however, does not require there be a target detection for the processing to occur. In fact, the coherent processing can actually improve the effective SNR, e.g., by distinguishing low wavenumber "noise" from the signal associated with a target passage, and it can thus improve target detectability.

Other Embodiments and Applications

It can be seen by those of skill in the art, that embodiments other than the above simulation and described embodiment may be possible and may find application. In general, the method can be applied to other instances, including, but not limited to, different: sensor type, target type, sensor/target geometry, and algorithm instantiation.

The method can be applied to other than uniform vehicle 14 spacing and speed. In a more realistic example, vehicle 14 spacing, although somewhat regular, may not be perfectly uniform and variability in vehicle 14 separation would spread the highlight over the separation dimension (L) in FIG. 6. Variation in vehicle 14 speeds would spread the highlight over the speed dimension (V) in FIG. 6.

Additionally, variations in sensor node 12 spacing can be expected in a more realistic example. The sensor node 12 spacing in such cases may have differing degrees of regularity depending on sensor node 12 deployment conditions and goals. A DFT may be used for non-uniformly spaced sensor nodes, instead of an FFT. However, the variable sensor node separation may increase the bin side lobes in the DFT.

For a single dimension Fourier transform (e.g., over time) the phase can provide information about the signal location within the window. The same principle can also be applied to this method to ascertain the location of a "short" convoy within the sensor node line. The phase from a spatial Fourier transform at a single point in time can indicate the location of the "group" within the sensor node line. Similar information would be possible from other sorts of temporal-spatial transforms as well.

As noted for the simulation results in FIGS. 4–6, an interval can be chosen in which the convoy extends across the full sensor node line. For cases where the convoy may not extend across the full line (i.e. a convoy entering a sensor node line, a convoy exiting a sensor node line, or a convoy shorter than the sensor node line), the highlight (e.g. 32 in FIG. 6) may be spread in both dimensions (e.g. frequency and wavenumber). In fact, if this smearing dominates that of speed and separation variability, then the spreading may be able to give a rough measure of the convoy length (in meters)

For the above example, the sensor node field 10 can be a one dimensional field, i.e., a line of sensor nodes 12, and the vehicles 14 may travel along that dimension, i.e., along the road 16. In principle, the method described herein can be applied to two dimensional sensor node fields, e.g., a grid of sensor nodes deployed to track target motion in two spatial dimensions.

Other orthogonal decompositions can be considered besides the sinusoidal decomposition used in the above example. Different decompositions may be considered for different purposes. It may be possible to define a basis set that concentrates the energy into a fewer number of waveforms than does the sinusoidal expansion. If a basis set can be defined in which the waveforms more closely resemble the actual intensity data than does a sinusoid, then the energy correlation can be better concentrated in a single basis vector instead of being spread over multiple waveforms, as in the example presented above. For instance, there may be wavelet transforms better suited for the observed low-rate sensor data. In one approach, an adaptive beamformer, known in the art, may be used to identify each "degree-of-freedom" in a sensor field and thus identify each target-wave propagating through the sensor field.

In one approach, an adaptive beamformer, known in the art, may be used to identify each "degree-of-freedom" in a sensor field and thus identify each target-wave propagating through the sensor field.

It is noted that, while the sensors of the above example may be acoustic sensors, the methods described can be applied to a larger class of sensors, including, but not limited to, seismic sensors, IR motion sensors, magnetic anomaly detection sensors, radiation and chem/bio sensors. It should also be noted that the processing (e.g. k-ω processing) may be typically performed in a centralized fashion, e.g., collecting the 2.5 Hz acoustic intensity data at one sensor node 12, or central processor 34 (shown in FIG. 1), and performing all the processing (e.g. a two dimensional Fourier transform) at that one location. However, the processing is not necessarily centralized and may in fact be decentralized. For the example case described above, the method can be implemented as a spatial FFT, where data can be incrementally multiplied and added from ever increasing line segments so as to gain ever increasing spatial resolution. Such a method may have the benefit that the incremental data merging can be automatically ceased when the "highlight" is no longer contained in a single "bin", e.g., the wavenumber bandwidth may be larger than the wavenumber bin width.

The method described herein may find use in applications other than acoustic vehicle tracking. For example, the method may be applicable to detection/tracking of humans possessing small amounts of metal on, or about, their person. It is known that metal may induce temporal magnetic anomalies as the metal passes through the earth's magnetic field. Magnetic anomaly detectors can easily detect large vehicles, such as tanks at distances of 10 meters. However, as the metal mass decreases and the stand-off distance increases, the detectability of the magnetic anomaly can become much more difficult. The ultimate detection capability of a single magnetic anomaly sensor is limited by the low frequency fluctuations in the earth's magnetic field. This "earth magnetic noise" can be characterized as a very low wavenumber spectrum.

If k-ω processing were used on an array of magnetic anomaly detectors, the earth's noise field would be concentrated in a low wavenumber. Higher wavenumber disturbances, like a disturbance generated as metal moves past one magnetic anomaly sensor, would appear at a higher wavenumber. The k-ω processing would discriminate the earth noise fluctuations from the "target" magnetic fluctuations, and thus may improve the detectability of people moving through a sensor node field with small amounts of metal.

Implementation

Figure 7:
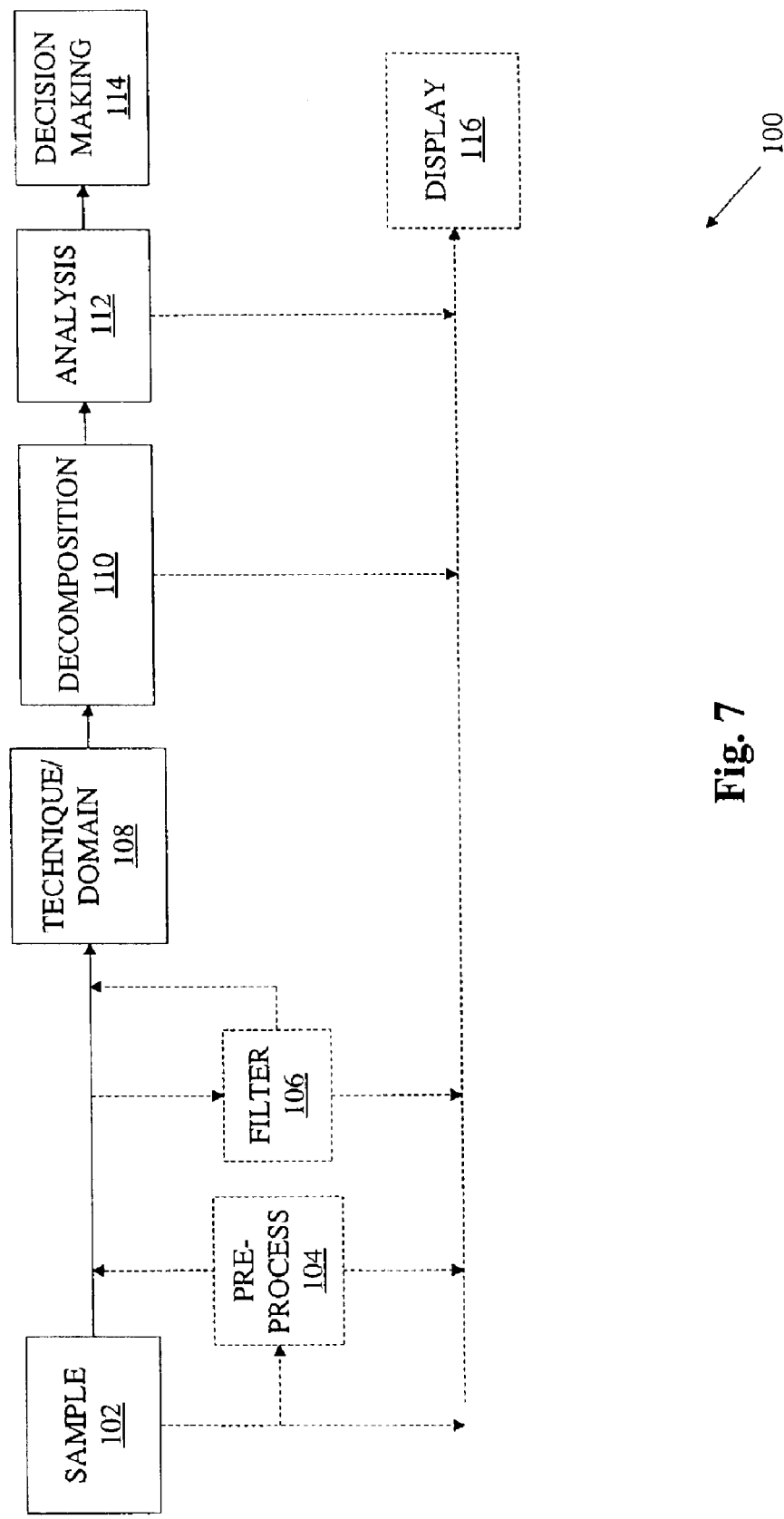
FIG. 7 is a flow chart of a DLT method based on coherent temporal-spatial processing to detect target-waves and estimate their parameters.

FIG. 7 illustrates a flow chart for one implementation of a DLT method 100 using the techniques described herein to process sensor data from a field of sensor nodes and obtain useful information regarding motion and location of a group of targets within the sensor field. As described herein, the system and method may focus primarily on DLT; however, systems and methods performing other functions, such as, but not limited to classification, may also be implemented using the principles described in relation to the DLT system and method.

Method 100 is described herein in relation to FIG. 1, though method 100 may be modified to be applicable to the variations and modifications described above. The sensor(s) on the sensor nodes 12 are typically sampled (102) at a predetermined rate. The sampling rate may be chosen depending on the type and number of sensors, processing limitations, or other criteria the user may desire to incorporate. It is noted that the sensor nodes 12 may directly provide low-rate data when sampled. Optionally, the data may be pre-processed, e.g., to convert high-rate acoustic pressure data to low-rate acoustic intensity data, as shown in phantom at 104 in FIG. 7. The low-rate data, either directly from sensor sampling at 102, or from pre-processing the sensor data at 104, may optionally be filtered to remove DC components, as also shown in phantom at 106 in FIG. 7.

Using the data from 102, or optionally from 104 or 106 if pre-processing and/or filtering are performed, an appropriate coherent temporal-spatial processing technique(s) may be chosen to extract features of interest (108) and the processing, or decomposition may be performed (110). For the previously described example using the sensor node field of FIG. 1, k-ω processing using a two-dimensional FT was performed, and the output was subsequently transformed to the L-V domain; the processing outputs are shown in FIGS. 5 and 6, respectively. The results of the processing can be analyzed (112) to extract relevant data, e.g., the separation and speed of the vehicles 14 with respect to the FIG. 1 example.

The analysis results can be used in a decision making process (114) to determine a future course of action, e.g., track, intercept, provide warnings, etc. Optionally, method 100 can maintain a display of, or otherwise present to a user, the data and/or results from one or more of the sampling (102), pre-processing (104), filtering (106), processing (110) or analyzing (112), as shown in phantom at 116. Such a display or presentation may assist in determining whether preprocessing and/or filtering is desirable, in choosing the processing techniques and domain and in the decision making process at 114. It can be understood that the processing at 104 through 112 may be performed on one or more sensor nodes, such as 12 of FIG. 1, and/or processors, such as 34 of FIG. 1.

The methods and systems described herein are not be limited to particular hardware or software configuration, and may find applicability in many computing or processing environments used in the DLT of targets. The methods can be implemented in hardware or software, or a combination of hardware and software. The methods can be implemented in one or more computer programs executing on one or more programmable computers that include a processor, a storage medium readable by the processor, one or more input devices, and one or more output devices. In some embodiments, such as that of FIG. 1, a central processing module may be used. In other embodiments, the methods may be implemented on a distributed set of processors on the sensor nodes in a network. User control for the systems and methods may be provided through known user interfaces.

The computer programs, or programs, may be preferably implemented using one or more high level procedural or object-oriented programming languages to communicate with a computer system; however, the program(s) can be implemented in assembly or machine language, if desired. The language can be compiled or interpreted. The computer program(s) can be preferably stored on a storage medium or device (e.g., non-volatile memory, CD-ROM, hard disk, or magnetic disk) readable by a general or special purpose programmable computer for configuring and operating the computer when the storage medium or device may be read by the computer to perform the procedures described herein. The method and system can also be considered to be implemented as a computer-readable storage medium, configured with a computer program, where the storage medium so configured may cause a computer to operate in a specific and predefined manner.

While the method and system has been disclosed in connection with the preferred embodiments shown and described in detail, various modifications and improvements thereon may become readily apparent to those skilled in the art. Those with ordinary skill in the art can recognize that the arrangement of the items shown in FIG. 1 may be merely for illustrative purposes, and can be varied accordingly; items may be combined, expanded, or otherwise reconfigured without departing from the scope of the disclosed methods.

The aforementioned changes may also be merely illustrative and not exhaustive, and other changes can be implemented. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method of tracking at least one target, the method comprising;
    sampling data from a plurality of sensors to provide a sampled measure of a temporal-spatial signal from the at least one target,
    using wave propagation analysis to identify a target wave in the sampled measure, the target wave resulting from motion of the at least one target,
    generating a result associated with the wave propagation analysis,
    analyzing the result to ascertain a motion parameter for the at least one target, and outputting the motion parameter to facilitate tracking the at least one target.

2. The method of claim 1, further comprising pre-processing data from the sensors to provide the sampled measure.

3. The method of claim 2, wherein the wave propagation analysis comprises k-ω processing of the sampled measure.

4. The method of claim 3, wherein the k-ω processing incorporates a temporal Fast Fourier transform.

5. The method of claim 3, wherein the k-ω processing incorporates a spatial Fast Fourier transform and the data is incrementally multiplied and added across sensor nodes.

6. The method of claim 3, wherein the k-ω processing incorporates a Discrete Fourier transform.

7. The method of claim 3, wherein the k-ω processing includes windowing the data prior to a Fourier transform of the data.

8. The method of claim 7, wherein windowing comprises applying a Hanning window to the data.

9. The method of claim 2, wherein the wave propagation analysis comprises time domain beamforming of the sampled measure.

10. The method of claim 2, wherein the wave propagation analysis comprises adaptive beamforming of the sampled measure.

11. The method of claim 2, wherein the wave propagation analysis is based on wavelet transformation of the sampled measure.

12. The method of claim 2, wherein the wave propagation analysis comprises at least one of spatial and temporal cross-correlation of the sampled measure.

13. The method of claim 2, wherein the sampled measure comprises acoustic intensity signals and the sensors comprise acoustic sensors.

14. The method of claim 13, wherein the sensors are chosen from a listing of acoustic sensors comprising acoustic pressure sensors, acoustic intensity sensors and acoustic airflow sensors.

15. The method of claim 2, wherein the sensors are chosen from a listing of acoustic sensors comprising acoustic pressure sensors, acoustic intensity sensors and acoustic airflow sensors.

16. The method of claim 2, where the sampled measure comprises seismic intensity signals and the sensors comprise seismic sensors.

17. The method of claim 2, wherein the sampled measure comprises magnetic anomaly signals and the sensors comprise magnetic sensors.

18. The method of claim 2, wherein the sampled measure comprises chemical agent concentration signals and the sensors comprise chemical sensors.

19. The method of claim 2, wherein the sampled measure comprises biological agent density signals and the sensors comprise biological agent sensors.

20. The method of claim 2, wherein the sampled measure comprises infrared radiation fluctuation signals and the sensors comprise infrared motion sensors.

21. The method of claim 2, wherein the sampled measure comprises nuclear radiation signals and the sensors comprise nuclear radiation sensors.

22. The method of claim 21, wherein the nuclear radiation sensors comprise Geiger counters.

23. The method of claim 2, wherein the pre-processing includes low-pass filtering and down-sampling the data.

24. The method of claim 2, wherein the pre-processing includes band-pass filtering and down-sampling the data.

25. The method of claim 2, wherein the pre-processing includes high-pass filtering the data.

26. The method of claim 2, wherein the pre-processing includes computation of the average signal power for the data.

27. The method of claim 26, wherein the computation of the average signal power for the data includes rectifying and low pass filtering the data.

28. The method of claim 26, wherein the computation of the average signal power for the data includes squaring and short term summing the data.

29. The method of claim 26, wherein the computation of the average signal power for the data includes performing a Hilbert transform on the data.

30. The method of claim 2, wherein the pre-processing includes pass-through filtering the data.

31. The method of claim 1, wherein the sensors are chosen from a listing of acoustic sensors comprising acoustic pressure sensors, acoustic intensity sensors and acoustic airflow sensors.

32. A computer-readable medium containing instructions for controlling a computer system to track multiple targets within a field of sensors by:
- controlling the computer system to sample data from a plurality of sensors to provide a sampled measure of a temporal-spatial signal from the multiple targets,
- controlling the computer system to use wave propagation analysis to identify target waves in the sampled measure resulting from motions of the multiple targets,
- controlling the computer system to generate a result associated with the wave propagation analysis,
- controlling the computer system to analyze the result to ascertain a motion parameter for the multiple targets, and
- controlling the computer system to output the motion parameter to facilitate tracking the multiple targets.

33. The computer readable medium of claim 32, wherein controlling the computer system comprises controlling the computer system to pre-process the data from the sensors to provide the sampled measure.

34. The computer readable medium of claim 33, wherein controlling the computer system to use wave propagation analysis comprises controlling the computer system to use k-$\omega$ processing of the sampled measure.

35. The computer readable medium of claim 33, wherein controlling the computer system to use wave propagation analysis comprises controlling the computer system to use time domain beamforming of the sampled measure.

36. The method of claim 33, wherein controlling the computer system to pre-process the data comprises controlling the computer system to perform a pre-processing technique chosen from a listing of pre-processing techniques including low-pass filtering, down-sampling, high-pass filtering, band-pass filtering, computation of average signal power, and pass-through filtering.

37. The method of claim 36, wherein controlling the computer system to pre-process the data comprises controlling the computer system to perform the computation of the average signal power chosen from a listing of computation techniques including rectifying and low-pass filtering, squaring and short term summing, and performing a Hilbert transform.

38. A system for tracking a plurality of targets, the system comprising:
- a plurality of sensors for providing data and a sampled measure of a temporal-spatial signal from the plurality of targets,
- a wave propagation analyzer for receiving the sampled measure and for identifying target waves in the sampled measure resulting from motions of the plurality of targets,
- a processor for ascertaining motion parameters for the plurality of targets based on the identified target waves and for outputting the motion parameter to track the plurality of targets.

* * * * *